April 14, 1970  J. J. BOOZER  3,506,132
COMBINATION WATER FILTERING AND WATER TREATING DEVICE
Filed May 2, 1968

INVENTOR.
JAMES J. BOOZER
BY Carl R. Brown
ATTORNEY

United States Patent Office 3,506,132
Patented Apr. 14, 1970

3,506,132
COMBINATION WATER FILTERING AND WATER TREATING DEVICE
James J. Boozer, 326 W. Park Ave., El Cajon, Calif. 92020
Filed May 2, 1968, Ser. No. 726,025
Int. Cl. B01d 29/30
U.S. Cl. 210—448      4 Claims

ABSTRACT OF THE DISCLOSURE

A combination water filtering and water treating device for use in cooling systems in engines used in motor vehicles and comprises a conical shaped filter screen with a rod of anode material secured to the conical screen at its apex.

BACKGROUND OF THE INVENTION

Particular engines that are used in motor vehicles and for other purposes employ liquid cooling systems for cooling the engine. These cooling systems normally employ water as the cooling liquid, since water is inexpensive and is readily available. The water is circulated through the engine by a pump and is channeled by appropriate hoses through a radiator that removes heat from the water. Since the engine and radiator are made of metal and the water usually has various degrees of hardness, depending upon where it was obtained, the cooling water in passing through the engine will cause rusting of the metal in the cooling portion of the engine and salts and the like will precipitate from the water. Thus deposits of rust, sludge, and other compositions accumulate in the engine and in the radiator and this accumulation eventually becomes so large that it restricts or stops fluid flow through the cooling system. While there are fluids with rust inhibitors that are used in the cooling system of a water cooled engine, these fluids in time either deteriorate or otherwise escape from the cooling system and water is used to replace the fluid. Thus the constant rusting and accumulation of sludge in the cooling system of engines can often lead to the engine overheating.

It therefore is advantageous to provide a filter to remove rust and sludge particles carried by the water in its circulating path through the engine and radiator and which filter has an anode that conditions the water to reduce or retard rusting and the precipitating of deposits from hard water in the cooling system.

SUMMARY OF THE INVENTION

The specific embodiment of my invention comprises a conical shaped filter screen that may be made of copper, beryllium copper, or other suitable metals that resist corrosion. A rigid circular ring is secured to the large end of the screen to provide structural integrity and provides a means for holding the conical screen in position in the input line of a cooling system, so that the water passes therethrough. A rod of anode material, that may comprise a material containing magnesium or zinc, is connected to the conical screen at its apex. The rod is positioned on the longitudinal axis of the conical filter screen and thus contacts the water passing therethrough.

The combination water filter and treating device is normally inserted into the cylinderical input pipe of the radiator. The ring has at least one and preferably two curved plates or flaps that fit outside the input pipe. The radiator hose is then fitted over the outside of the flaps and the input pipe and secured by known hose clamps or the like, holding the filter in position.

In one embodiment the anode rod extends from a point within the conical filter screen volume to a point beyond the apex of the filter screen and passes through the apex end of the conical screen. The open apex end of the conical screen is fixed to the anode at approximately the mid-point of the anode rod. In another embodiment, the anode rod is secured to a ring that is in turn secured to the conical filter screen at a point adjacent the apex of the cone.

It has often been considered unwise to place a filter in the cooling system of a water cooled engine. This was generally based upon the consideration that the accumulated sludge, rust and precipitated salts and the like, will plug the filter causing a stoppage of water flow. In employing my invention, the anode rod reduces the occurrence of rust and precipitated sludge from the hard water thus making the use of a filter feasible. Further the conical filter screen allows the accumulation of sludge in the narrow portion of the cone without restricting fluid flow through the filter screen adjacent the large opening in the conical screen. While it is still necessary from time to time to remove the screen, clean it and check the anode, and replace the unit should the anode be sufficiently deteriorated, the combined use of the anode and the conical screen provides a combined and coordinated reduction in the rust and sludge in the cooling system.

It is therefore a object of this invention to provide a new and improved combination water filtering and water treating device for use in water cooling systems in engines.

It is another object of this invention to provide a new and improved combination water filtering and water treating device that both reduces the creation of rust and hard water sludge and filters out the rust and sludge particles in the cooling system.

It is another object of this invention to provide a new and improved combination water filtering and water treating device that is capable of accumulating rust and sludge particles without stopping fluid flow therethrough.

It is another object of this invention to provide a new and improved combination water filtering and water treating device that employs an anode rod that is positioned by the filtering device in the direct path of water flow through the cooling system and which combination structure rigidly holds the anode.

Other objects and many advantages of my invention will become more apparent upon a reading of the following detailed description in which like parts are designated by like reference numerals throughout and in which.

Figure 1:
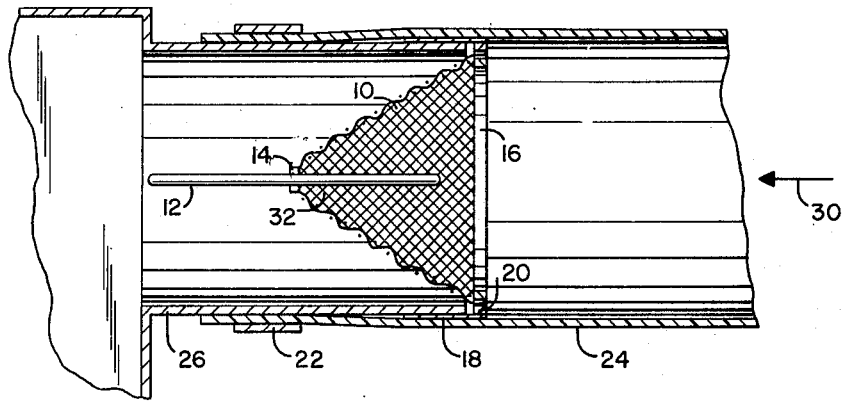
FIGURE 1 is a cross sectional view with parts broken away of an embodiment of the combination water filtering and water treating device of this invention as positioned and secured in the input line of a radiator.
Figure 2:
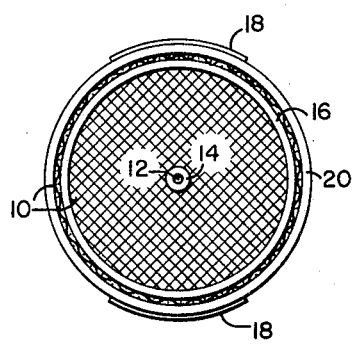
FIGURE 2 is an end plan view of an embodiment of the combination water filtering and water treating device.

Referring now to FIGURE 1, a radiator input pipe 26 that may be made of brass, copper, aluminum or any other suitable metal has the normal hose connection 24 that is secured thereto by a known band clamp 22. The water passes from the engine in the direction of arrow 30 and flows through the radiator and back into the engine in the known circulating cooling system path of engine and radiator combinations. A conical filter screen 10, having a suitable size mesh, is secured at its larger end between a pair of rings 16 and 18. The rings may be crimped against the sandwiched filter screen or the filter screen may be secured to the rings by soldering or by other known connecting techniques. A pair of curved flaps 18 are secured to the outer ring 20, see FIGURE 2, which ring flaps or plates 18 fit over the outside of the radiator input pipe 26 and function to hold the filter in position. The hose connection 24 fits against the outside of the flaps 18 and thus grip the flaps between the hose 24 and the radiator input pipe 26.

An anode rod 12, that may comprise magnesium or zinc material or any other suitable anode material, passes through the apex end of the conical screen 10 and is secured to the conical screen 10 by ring 14. The ring 14 may be crimped or soldered to the anode 12 and in turn is connected to the screen 10 by soldering or by other suitable known connecting techniques.

Figure 3:
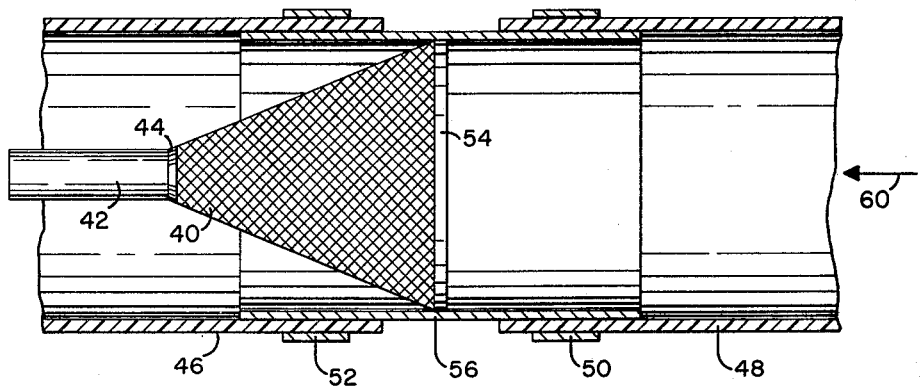
FIGURE 3 is a side view with parts in section and parts broken away illustrating the positioning of an embodiment of the water filtering and water treating device secured in an intermediate position in water carrying hoses.

A second modification of the invention is illustrated in FIGURE 3 wherein a conical screen 40 is secured by outer ring 54 to a cylindrical member 56. The large end of the conical screen 40 is secured between a pair of rings, as illustrated in FIGURE 1, with the inner ring not being shown in FIGURE 3. The apex end of the conical screen 40 is secured to a ring 44, that may also be a circular plate, to which is secured an anode rod 42. The rod 42 is secured to the ring 44 in any known manner and ring 44 is secured to the end of the conical screen 40 by soldering or by other suitable known techniques. The cylindrical sleeve 56 is inserted in the water carrying hose leading to the radiator of an engine. The hose is parted with ends 46 and 48 slipping over the sleeve 56 and being secured thereto by hose clamps 50 and 52.

OPERATION

In operation, the conical screen filter and connected anode is inserted in the input line carrying water from the engine to the radiator in the manner previously described. Water in passing along the direction of the respective arrows 30 and 60 passes through the screens 10 and 40 that filter out particles of rust and hard water precipitates. The anode, whether comprising magnesium or zinc, dissolves in the cooling water and in the case of using magnesium, displaces hydrogen by reacting with water to release the hydrogen. This reduces the oxidation of the metal in the engine and in other parts of the cooling water system and also reduces the precipitation of particles from the hard water. The particular connection in FIGURE 1 holds the anode in a secure position that is maintained even though the anode is dissolved considerably by the water passing in contact therewith.

It is to be noted that the anode structure in FIGURES 1 and 3 can be interchanged as desired without detracting from this invention.

Having described my invention, I now claim:

1. A combination water filtering and water treating device for use in cooling systems in engines used in motor vehicles comprising,
a conical shaped filter screen,
a rigid circular ring secured to the large end of said screen,
said ring being normal to the longitudinal axis of said conical screen,
a rod of anode material secured to the apex of said conical screen,
said rod being positioned on and aligned with the longitudinal axis of said conical screen,
said ring having at least one curved plate secured thereto for fitting outside a receiving pipe,
and said plate being parallel with the longitudinal axis of the conical screen and extending in a direction toward the apex of said conical screen.

2. A combination water filtering and water treating device for use in cooling systems in engines used in motor vehicles comprising,
a conical shaped filter screen,
a rigid circular ring secured to the large end of said screen,
said ring being normal to the longitudinal axis of said conical screen,
a rod of anode material secured to the apex of said conical screen,
said rod being positioned on and aligned with the longitudinal axis of said conical screen,
said ring being secured to the outside surface of said conical screen,
and a second ring being secured to the inside surface of said conical screen.

3. A combination water filtering and water treating device as claimed in claim 2 including,
a tubular member,
and said ring being secured to the inner surface of said tubular member.

4. A combination water filtering and water treating device as claimed in claim 3 in which,
said ring being secured along the length of said tubular member,
and said tubular member having sufficient length to receive a connecting and hose clamp on each end.

References Cited

UNITED STATES PATENTS

| | | | |
|---|---|---|---|
| 2,384,057 | 9/1945 | Wetherell | 210—445 X |
| 2,560,960 | 7/1951 | Klumb | 210—460 X |
| 2,982,418 | 5/1961 | Balley | 210—448 |

REUBEN FRIEDMAN, Primary Examiner

T. A. GRANGER, Assistant Examiner